US010013275B2

(12) United States Patent
Vyas et al.

(10) Patent No.: US 10,013,275 B2
(45) Date of Patent: Jul. 3, 2018

(54) EXECUTING CODE REFERENCED FROM A MICROSERVICE REGISTRY

(71) Applicant: Red Hat, Inc., Raleigh, NC (US)

(72) Inventors: Jay Vyas, Concord, MA (US); Huamin Chen, Westborough, MA (US)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 15/354,420

(22) Filed: Nov. 17, 2016

(65) Prior Publication Data

US 2018/0136959 A1 May 17, 2018

(51) Int. Cl.
G06F 9/455 (2018.01)
H04L 29/08 (2006.01)

(52) U.S. Cl.
CPC ........... *G06F 9/45558* (2013.01); *G06F 2009/45595* (2013.01); *H04L 67/10* (2013.01)

(58) Field of Classification Search
None
See application file for complete search history.

(56) References Cited

U.S. PATENT DOCUMENTS

| 7,194,543 | B2 | 3/2007 | Robertson et al. |
| 8,843,939 | B2 | 9/2014 | Lesandro et al. |
| 9,363,301 | B2 | 6/2016 | Lawson et al. |
| 9,369,406 | B2 | 6/2016 | Thomas et al. |
| 9,467,476 | B1 | 10/2016 | Shieh et al. |
| 2006/0168156 | A1* | 7/2006 | Bae .................. H04L 67/1008 709/220 |
| 2010/0299437 | A1* | 11/2010 | Moore .............. H04L 67/1008 709/226 |
| 2016/0127454 | A1* | 5/2016 | Maheshwari ........ H04L 47/70 709/223 |
| 2016/0269425 | A1* | 9/2016 | Shieh ................ H04L 63/1416 |
| 2017/0046146 | A1* | 2/2017 | Jamjoom ............... G06F 8/62 |

FOREIGN PATENT DOCUMENTS

WO 2016/099346 A1 6/2016

OTHER PUBLICATIONS

Krijger, Quinten, Executable Images—How to Dockerize Your Development Machine, Aug. 29, 2015 (6 pages) Link: https://www.infoq.com/articles/docker-executable-images.

(Continued)

*Primary Examiner* — Tammy E Lee
(74) *Attorney, Agent, or Firm* — K&L Gates LLP (57) ABSTRACT

Methods and systems for executing code referenced from a microservice registry are disclosed. For example, a microservice registry is stored in a memory. The microservice registry includes references to a plurality of microservices including a first microservice. An isolated guest executing on one or more processors receives a request to execute an executable code and determines that the executable code is unavailable in the first isolated guest. The isolated guest determines that, based on the microservice registry, the first microservice executes the executable code. The isolated guest forwards the first request to the first microservice and receives a result of the request from the first micro service.

19 Claims, 4 Drawing Sheets

(56) References Cited

OTHER PUBLICATIONS

Namit, Enterprise Application Platform with Microservices—A Service Fabric Perspective, Jun. 21, 2016 (4 pages) Link: https://blog.kloud.com.au/2016/06/21/enterprise-application-platform-with-microservices-a-service-fabric-perspective/.

Bryant, Daniel, Docker and High Security Microservices: A Summary of Aaron Grattafiori's DockerCon 2016 Talk, Aug. 14, 2016 (5 pages) Link: https://www.infoq.com/news/2016/08/secure-docker-microservices.

Super Small Docker Image Based on Alpine Linux (11 pages) Link: https://news.ycombinator.com/item?id=10782897.

Clink: containerize all the things (3 pages) Link: https://github.com/soulshake/clink.

* cited by examiner

EXECUTING CODE REFERENCED FROM A MICROSERVICE REGISTRY

BACKGROUND

The present disclosure generally relates to improving the executing of isolated guests deployed in a network environment. In computer systems, it may be advantageous to scale application deployments by using isolated guests such as virtual machines that may be used for creating hosting environments for running application programs. Typically, isolated guests such as containers and virtual machines may be launched to provide extra compute capacity of a type that the isolated guest is designed to provide. Isolated guests allow a programmer to quickly scale the deployment of applications to the volume of traffic requesting the applications. Isolated guests may be deployed in a variety of hardware environments. There may be economies of scale in deploying hardware in a large scale. To attempt to maximize the usage of computer hardware through parallel processing using virtualization, it may be advantageous to create very lean isolated guests, designed to include only components necessary to achieve the function for which these isolated guests are designed. Many isolated guests are built from image files, and the image files tend to be designed to be lean to decrease the latency required to launch an isolated guest. Therefore, careful consideration is typically taken by a developer to decide what components (e.g., code blocks, applications, features, or configurations) may be removed from an isolated guest image while still keeping the isolated guest functional and fit for purpose.

SUMMARY

The present disclosure provides a new and innovative system, methods and apparatus for executing code referenced from a microservice registry. In an example, a microservice registry is stored in a memory. The microservice registry includes references to a plurality of microservices including a first microservice. An isolated guest executing on one or more processors receives a request to execute an executable code and determines that the executable code is unavailable in the first isolated guest. The isolated guest determines that, based on the microservice registry, the first microservice executes the executable code. The isolated guest forwards the first request to the first microservice and receives a result of the request from the first microservice.

Additional features and advantages of the disclosed method and apparatus are described in, and will be apparent from, the following Detailed Description and the Figures.

DETAILED DESCRIPTION OF EXAMPLE EMBODIMENTS

In computer systems utilizing isolated guests, typically virtual machines and/or containers are used. In an example, a virtual machine ("VM") may be a robust simulation of an actual physical computer system utilizing a hypervisor to allocate physical resources to the virtual machine. In some examples, container based virtualization system such as Red Hat® OpenShift® or Docker® may be advantageous as container based virtualization systems may be lighter weight than systems using virtual machines with hypervisors. Isolated guests tend to be constructed from image files, the image files typically composed of individual layers of components. An isolated guest may be constructed with intent to minimize the number of layers and the size of the isolated guest to speed up loading time and deployment of the isolated guest. As a result, such isolated guests may lack some of the functionality generally associated with a general purpose computer, for example, the capability to view a website, install a new program to the isolated guest, or to edit certain types of files.

In a small scale environment such as a testing environment, deficiencies in the capabilities of a certain isolated guest may be overcome with certain utilities. For example, a program called clink is a wrapper available for Docker® in systems utilizing Docker® containers that allows a container to launch another Docker® container to execute code that is not installed or available on the first container. Implementing a clink-style solution outside of testing may be problematic, however, because in order for a container to be able to launch another container, the container generally requires elevated rights in the container's host operating system, leaving open a potential security risk for malicious actors to exploit. In an example, a malicious actor may gain access to a container with elevated rights and run malicious code of their choosing in other containers or other parts of the system. A malicious actor may also attempt to reroute a request into an image file that has been tampered with resulting in a compromised container being launched, without having first gained sufficient access to launch the container independently. Additionally, in an optimization scenario, factoring in the lifecycle costs of another container greatly erodes the efficiency gains from the containerization of the first application, possibly defeating the purpose of using the container in a production environment for compute efficiency altogether.

The present disclosure aims to address handling atypical requests to execute code from isolated guests through the use of microservices and a microservice registry. In an example, a microservice may be a flexible, independently deployable software system, designed to be lightweight and granular. A microservice may be designed to be responsible for a particular well defined task in a system or network of systems. In an example, a microservice registry may include references to the microservices available in a network environment, including the capabilities, and the expected inputs and outputs of each of the microservices in the microservice registry. In an example, there are microservices referenced to by the microservice registry in the environment that are deployed for the purpose of handling many commonly executed pieces of code, such as binary executables files, scripts and programs that may not be packaged into isolated guests like containers or VMs launched in the environment. In an example, an executable component may be added to the operating system of a container, for example in the /bin/ directory that may interface with a microservice registry and microservices. For the relatively low cost of maintaining fairly static microservices and the microservice registry, these microservices may be available to cover the unforeseen, one-off scenarios where a container may need to execute code that is not built into the container. In an example, a cloud services provider may also host many commonly used executables, such as binary executable files, scripts and programs as a centralized service provided to users and tenants of the network.

Figure 1:
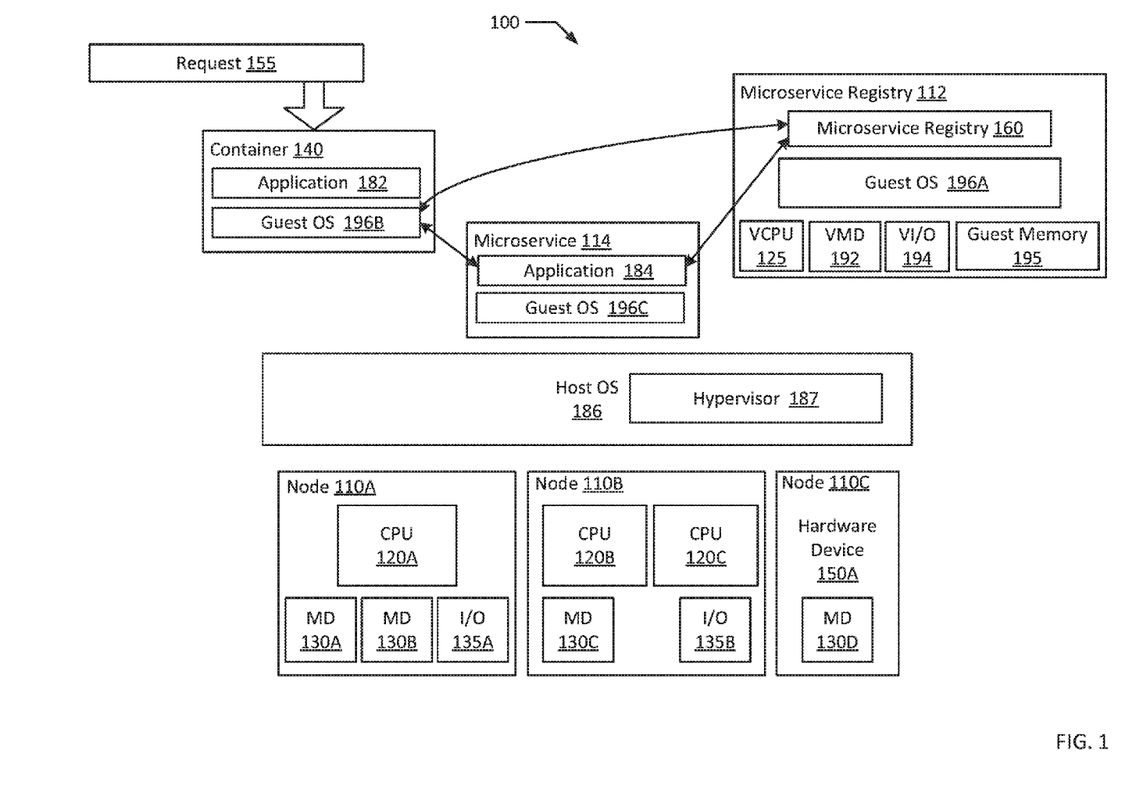
FIG. 1 is a block diagram of a virtual machine system executing code referenced from a microservice registry according to an example of the present disclosure.

FIG. 1 is a block diagram of a virtual machine system executing code referenced from a microservice registry according to an example of the present disclosure. The system 100 may include one or more interconnected nodes 110A-C. Each node 110A-B may in turn include one or more physical processors (e.g., CPU 120A-C) communicatively coupled to memory devices (e.g., MD 130A-C) and input/output devices (e.g., I/O 135A-B). Node 110C may include a hardware device (e.g., hardware device 150A) and a memory device 130D. In an example, a hardware device (e.g., 150A) may include a network device (e.g., a network interface controller (NIC), a network adapter, or any other component that connects a computer to a computer network), a peripheral component interconnect (PCI) device, storage devices, sound or video adaptors, photo/video cameras, printer devices, keyboards, displays, graphics cards etc.

As used herein, physical processor or processors 120A-C refers to a device capable of executing instructions encoding arithmetic, logical, and/or I/O operations. In one illustrative example, a processor may follow Von Neumann architectural model and may include an arithmetic logic unit (ALU), a control unit, and a plurality of registers. In an example, a processor may be a single core processor which is typically capable of executing one instruction at a time (or process a single pipeline of instructions), or a multi-core processor which may simultaneously execute multiple instructions. In another example, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

As discussed herein, a memory device 130A-D refers to a volatile or non-volatile memory device, such as RAM, ROM, EEPROM, or any other device capable of storing data. As discussed herein, I/O device 135A-B refers to a device capable of providing an interface between one or more processor pins and an external device, the operation of which is based on the processor inputting and/or outputting binary data.

Processors 120A-C may be interconnected using a variety of techniques, ranging from a point-to-point processor interconnect, to a system area network, such as an Ethernet-based network. Local connections within each node 110A-C, including the connections between a processor 120A and a memory device 130A-B and between a processor 120A and an I/O device 135A may be provided by one or more local buses of suitable architecture, for example, peripheral component interconnect (PCI).

In an example, system 100 may run one or more isolated guests, for example, microservice registry 112, microservice 114, and container 140 may all be isolated guests. In an example, container 140 may be a container using any form of operating system level virtualization, for example, Red Hat® OpenShift®, Docker® containers, chroot, Linux®-VServer, Solaris® Containers (Zones), FreeBSD® Jails, HP-UX® Containers (SRP), VMware ThinApp®, etc. Containers may also run directly on host operating system 186 or run within another layer of virtualization, for example, in a virtual machine. Microservice registry 112 may be a virtual machine, executing on a software layer (e.g., a hypervisor 187) above the hardware and below the isolated guests. In an example, a hypervisor 187 may be a component of the host operating system 186 executed by the system 100. In another example, the hypervisor 187 may be provided by an application running on the operating system 186, or may run directly on the system 100 without an operating system beneath it. The hypervisor 187 may virtualize the physical layer, including processors, memory, and I/O devices, and present this virtualization to the microservice registry 112 as devices, including virtual processor 125, virtual memory device 192, and/or virtual I/O devices 194. Virtual machines may utilize any virtualization technology, including but not limited to Red Hat® Virtualization Manager™, Linux®-VServer™ Windows® Virtual PC™, various virtualization solutions available from ORACLE® CORPORATION and VMware®, etc. In an example, microservice registry 112, microservice 114, and container 140 may be some of many possible containers and or virtual machines constructed and stored within nodes 110A-C. In an example, microservice 114 may be a container, a virtual machine, another form of isolated guest, or an application in a host OS (e.g., host OS 186). In another example, the functions performed by microservice registry 112 may be performed by a container or physical host instead of a VM. In another example, the functions performed by container 140 may be performed by a VM or a physical host instead of a container.

In an example, a micro service registry 112 may be a VM executing a guest operating system 196A which may utilize the underlying VCPU 125, VMD 192, and VI/O devices 194. One or more applications including a microservice registry 160 may be running on microservice registry 112 under the respective guest operating system 196A. Processor virtualization may be implemented by a hypervisor 187 scheduling time slots on one or more physical processors 120A-C such that from the guest operating system's perspective those time slots are scheduled on a virtual processor 125.

A microservice registry 112 may run on any type of dependent, independent, compatible, and/or incompatible applications on the underlying hardware and OS 186. In an example, an application (e.g., microservice registry 160) running on a microservice registry 112 may be dependent on the underlying hardware and/or OS 186. In another example, microservice registry 160 running on a microservice registry 112 may be independent of the underlying hardware and/or OS 186. Additionally, microservice registry 160 running on microservice registry 112 may be compatible with the underlying hardware and/or OS 186. In an example, microservice registry 160 running on a microservice registry 112 may be incompatible with the underlying hardware and/or OS. In an example, a device may be implemented as a microservice registry 112. A hypervisor 187 may manage memory for the host operating system 186 as well as memory allocated to the microservice registry 112 and guest operating system 196A such as guest memory 195A provided to guest OS 196.

In some examples, the microservice registry 160 may include or be associated with any suitable type of database, for example, a relational database. The microservice registry 160 may be associated with a database management system (DBMS). A DBMS is a software application that facilitates interaction between the database and other components of the nodes 110A-C. For example, a DMBS may have an associated data definition language describing commands that may be executed to interact with the database. Examples of suitable DMBS's include MariaDB®, PostgreSQL®, SQLite®, Microsoft SQL Server® available from MICROSOFT® CORPORATION, various DBMS's available from ORACLE® CORPORATION, various DBMS's available from SAP® AG, IBM® DB2®, available from the INTERNATIONAL BUSINESS MACHINES CORPORATION, etc. In an example, the microservice registry 160 may be organized as a formal database with a schema such as a relational schema with defined tables, indices, links, triggers, various commands etc. In some examples, the storage component of microservice registry 160 may not be organized as a formal database, but may instead be an alternative storage structure capable of holding the information and being queried in relation to the status of microservices in system 100, including but not limited to a file, folder, directory, registry, etc. In some examples, the microservice registry 160 may reside over a network (not depicted), which may be, for example, a public network (e.g., the Internet), a private network (e.g., a local area network (LAN) or wide area network (WAN)), or a combination thereof.

In an example, each of microservice registry 112, microservice 114 and container 140 may be combined in one isolated guest or more isolated guests, or a physical host node may perform the functions of any one of microservice registry 112, microservice 114 and container 140. In an example, container 140 may be a container designed to execute application 182 on top of guest operating system 196B. Container 140 may receive a request 155 to execute code that is unavailable (e.g., not installed) on container 140. In an example, microservices registry 112 may be a virtual machine hosting a microservices registry micro service registry 160. Microservice 114 may be an isolated guest, such as a container or virtual machine, whose designed purpose is to host and execute application 184 on guest operating system 196C.

Figure 2:
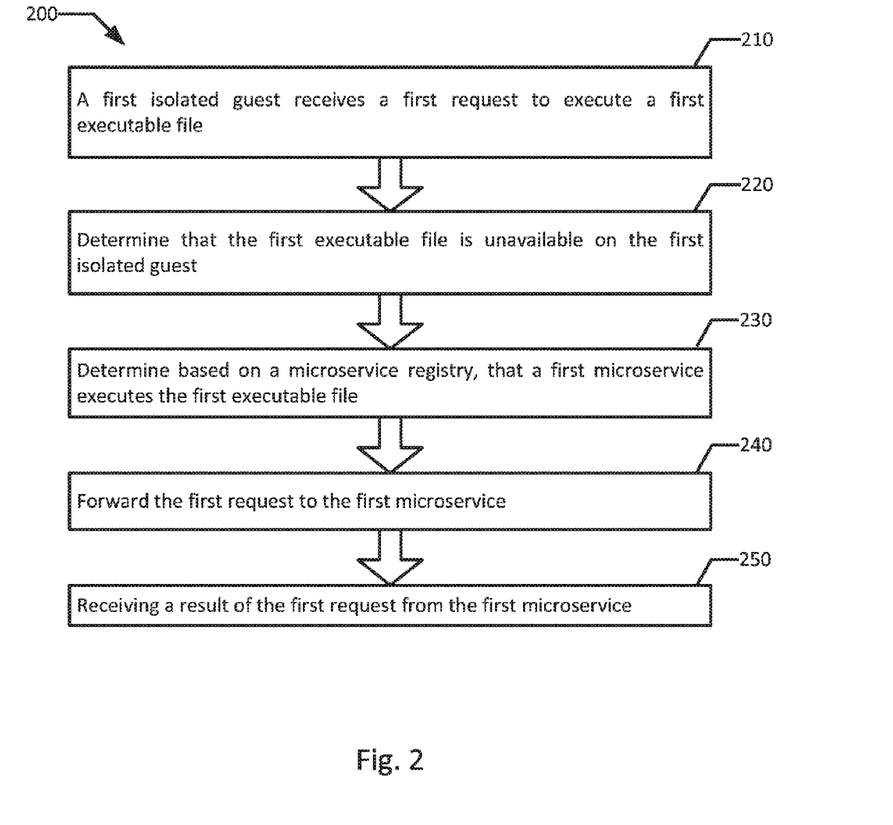
FIG. 2 is a flowchart illustrating an example of executing code referenced from a microservice registry according to an example of the present disclosure.

FIG. 2 is a flowchart illustrating an example of executing code referenced from a microservice registry according to an example of the present disclosure. Although the example method 200 is described with reference to the flowchart illustrated in FIG. 2, it will be appreciated that many other methods of performing the acts associated with the method 200 may be used. For example, the order of some of the blocks may be changed, certain blocks may be combined with other blocks, and some of the blocks described are optional. The method 200 may be performed by processing logic that may comprise hardware (circuitry, dedicated logic, etc.), software, or a combination of both. In an example, the method is performed by an isolated guest such as a container 140.

A first isolated guest receives a first request to execute a first executable code (block 210). In an example, container 140 may receive a request 155 to execute application 184. In an example, application 184 may be a binary executable file, a script, a program, or any other executable computational entity capable of returning a result from a given input. In an example, a user logged into container 140 may decide to execute cURL to pull data from a website. A user may also decide to execute a binary executable like git to access a source code repository. In another example, application 182 executing on container 140 may run into a rarely executed portion of application 182's logic requiring output from application 184. In an example, a programmer constructed an image file from which container 140 was built without adding application 184 to the image file.

It is determined that the first executable code is unavailable on the first isolated guest (block 220). In an example, the guest operating system 196B may discover that application 184 is unavailable on container 140. In an example, container 140 and/or the guest operating system 196B may be configured to produce an error when an executable code that is unavailable is requested. In an example, a user, upon seeing an error indicating that a requested application is unavailable (e.g., cURL or git), the user may attempt to execute an installer (e.g., yum) to install cURL and/or git, and may discover that the installer is also unavailable on container 140. In an example, the user may choose to use microservice registry 160 to handle the request. In an example, a user may be testing dependencies for an application to be deployed to a new container, and may choose to install the missing executable code to the container or add the missing executable code to an image file used to construct the container rather than executing the executable code with a microservice.

The first isolated guest may determine, based on a microservice registry, that a first microservice executes the first executable code (block 230). In an example, upon determining that application 184 is unavailable on container 140, at least one of the container 140 and the guest operating system 196B may query a microservice registry 160 to determine if there is an accessible microservice that may execute application 184. In an example, container 140 may receive a response to its query to microservice registry 160 indicating that microservice 114 executes application 184. In an example implementation, the guest operating system 196B may include a wildcard executable that executes against microservice registry 160, capable of capturing any requests for executing code that are not available in container 140 and sending the name of the executable code in a query to microservice registry 160. In an example, microservice registry 160 may be located over a network from container 140. In an example, microservice registry 160 may include references to a second microservice that executes application 184.

The first isolated guest forwards the first request to the first microservice (block 240). In an example, the container 140 may forward the request 155 to microservice 114, including any data associated with the request 155. In an example, data associated with request 155 is compressed and/or encrypted before transfer. In an example, microservice 114 may be another isolated guest, for example a container or a virtual machine, and/or may be located over a network from container 140. In an example, container 140, guest operating system 196B and/or a user may select microservice 114 over another microservice executing application 184 based on factors including a comparison of the version of application 184 executing on microservice 114 versus on the second microservice, a comparison of the current response time between the two microservices, a comparison of the location of the two microservices, and/or user preference. A user request to execute cURL on container 140 may include additional arguments, such as the URL of a website to retrieve, and a location to store the downloaded data, these arguments may be passed on to microservice 114. A user request to execute git may include a directory to be uploaded or downloaded from a source code repository, and may be compressed and/or encrypted before being passed to the microservice executing git, for example, to reduce size and network latency and/or increase security.

The first isolated guest receives a result of the first request from the first microservice (block 250). In an example, container 140 may receive the output of executing application 184 from microservice 114, and may display the result to a user who may be a requester of the execution of application 184. In an example, the request to execute application 184 may be an intermediary step, and the container 140 may use the result of the execution of application 184 in a second request, for example, for container 140 to execute application 182. A user requesting to execute cURL may receive the contents of the website requested in a file from a microservice executing cURL. For example, a request to retrieve the html code used to generate the website may result in an html file in a specified directory. A request may also be made to load content from a website using cURL to be processed by an application executing on container 140. For example, a retrieved html file may be an input for a program to search for keywords in an input file (e.g., a file created from the output of the cURL program). A user requesting to execute git may receive confirmation that their files have been stored to a source code repository or receive files retrieved from the source code repository. For example, the user may retrieve a directory from the source code repository to an indicated location or in the form of a compressed file containing the files and directories requested.

In an example, a second request may be received by container 140, to execute a different application that is also unavailable on container 140. In an example, the container 140 may determine, for example through the use of microservice registry 160, that microservice 114 and a different, second isolated guest execute the second unavailable application. In an example, the container 140 forwards the second request to either the microservice 114 or the second isolated guest that executes the second unavailable application and receives the results of the request. In the example, the second isolated guest that executes the second unavailable application may be hosted on the same hardware as container 140 (e.g., nodes 110A-C) or on different hardware, for example, across a network from container 140. In another example, the container 140 may determine that a node of nodes 110A-C or host operating system 186 executes the second unavailable application, and forwards the request to nodes 110A-C or host operating system 186, and then receives the results of the second request.

Figure 3:
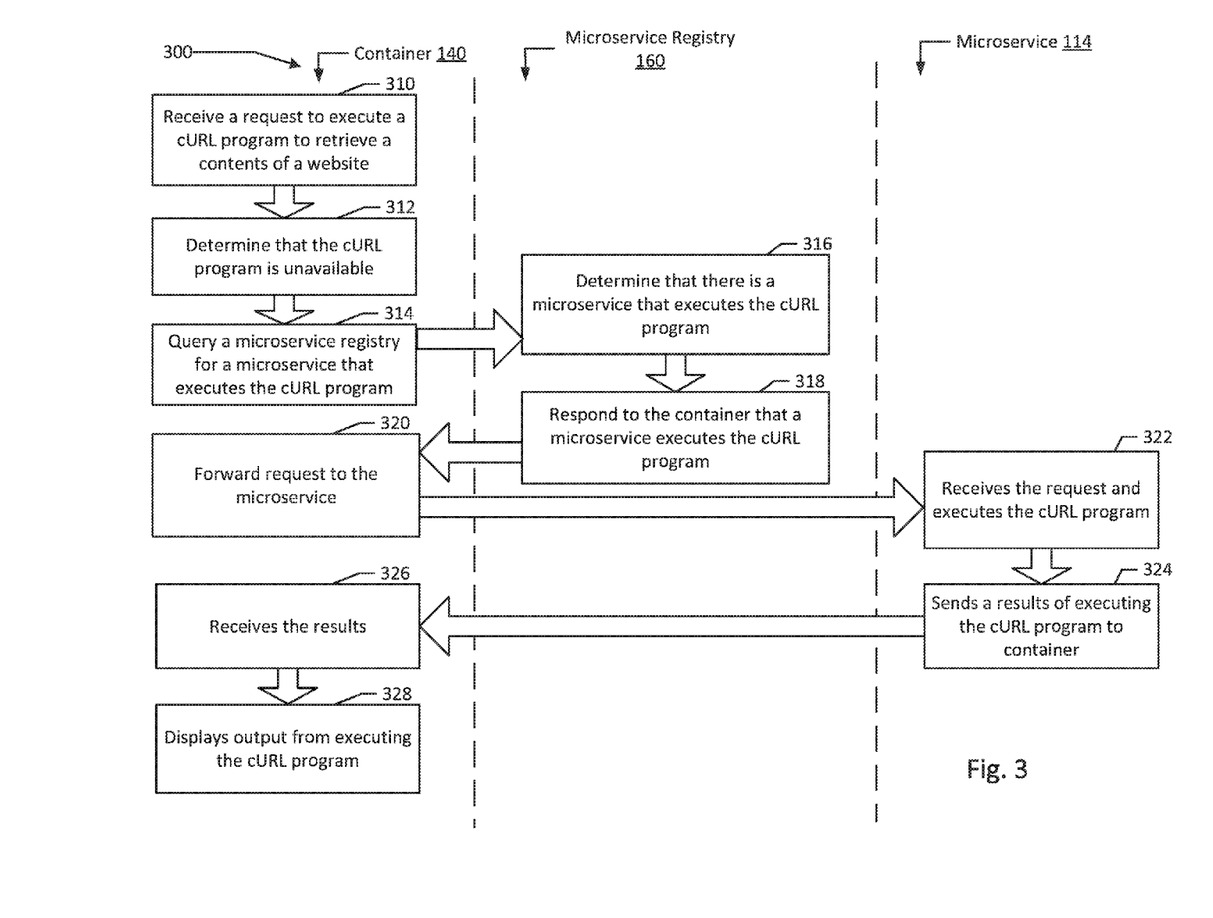
FIG. 3 is a flow diagram illustrating an example system executing code referenced from a microservice registry according to an example of the present disclosure.

FIG. 3 is a flow diagram illustrating an example system executing code referenced from a microservice registry according to an example of the present disclosure. Although the examples below are described with reference to the flowchart illustrated in FIG. 3, it will be appreciated that many other methods of performing the acts associated with FIG. 3 may be used. For example, the order of some of the blocks may be changed, certain blocks may be combined with other blocks, and some of the blocks described are optional. The methods may be performed by processing logic that may comprise hardware (circuitry, dedicated logic, etc.), software, or a combination of both. In illustrated example 300, the isolated guest is a container 140 querying microservice registry 160 and utilizing microservice 114 to execute a request.

In an example, container 140 receives a request to execute the cURL program to retrieve the contents of a website (block 310). In an example, the request may be to execute any program, script or code on the container, either from a user or from another program. In an example, the container 140 determines that the cURL program is unavailable (block 312). In the example, the cURL program may be unavailable for any reason. For example, the cURL program may never have been installed in the container 140. In another example, the determination that the program is unavailable, and any of the other actions performed by the container 140, may be made by any component of the container 140. For example, the guest operating system 196B may include a component such as a binary executable file that may catch requests for unavailable executable code to be forwarded to a microservice registry 112. In an example, the container 140 queries a microservice registry for a microservice that executes the cURL program (block 314). For example, microservice registry 160 may receive the query for a microservice that executes the cURL program.

The microservice registry 160 determines that there is a microservice that executes the cURL program (block 316). In an example, the microservice registry 160 may query a database associated with the microservice registry 160 for a microservice that executes the cURL program, and may successfully identify that a microservice 114 executes the cURL program. In an example, the microservice registry 160 responds to the container 140, informing container 140 that microservice 114 executes the cURL program (block 318).

In an example, after receiving the response from microservice registry 160, container 140 may forward the request to execute the cURL program to microservice 114 (block 320). In a further example, any associated information necessary for the request such as a URL of the website to be retrieved may also be forwarded to microservice 114. In an example, container 140 may forward its stdin standard stream to microservice 114 such that the cURL program executing on microservice 114 may process the request as if the request originated in microservice 114. In an example, microservice 114 receives the request and executes the cURL program (block 322). In an example, the microservice 114 successfully executes the cURL program to receive the contents of the website at the URL provided. In an example, the microservice 114 sends the results of executing the cURL program back to container 140 (block 324). In an example, container 140 receives the results (block 326). In some examples, container 140 may receive the results, for example, in its stdout standard stream as if container 140 executed the cURL application. In an example, the container 140 may notify a user. In an example, the container 140 may write a notification to a log file or display a message on the screen, that the cURL application was not executed by container 140. In an example, the container 140 may log that microservice 114 executed the cURL application. In an example, the container 140 may display the output from executing the cURL program (block 328). For example, the results from the user's request to execute the cURL program may be displayed via stdout on the screen of the user or wherever the user has forwarded the contents of stdout. Accordingly, for example, the user may be unaware that microservice 114 played a part in the user's request to execute the cURL application.

Figure 4:
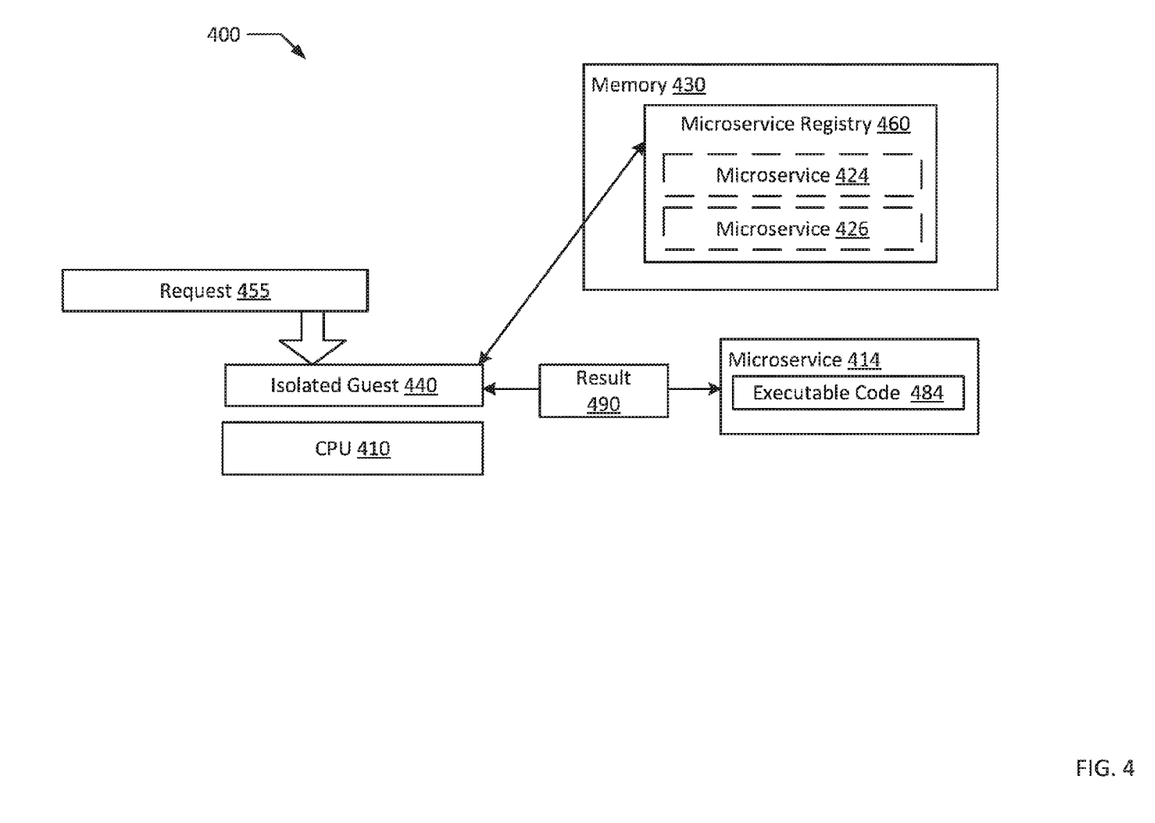
FIG. 4 is a block diagram of an example system executing code referenced from a microservice registry according to an example of the present disclosure.

FIG. 4 is a block diagram of an example system executing code referenced from a microservice registry according to an example of the present disclosure. Example system 400 may include a memory 430 storing a microservice registry 460. The microservice registry 460 includes references to microservices (e.g., 424 and 426), where reference to microservice 424 is a reference to a first microservice 414. In an example, isolated guest 440 executes on one or more processors 410, and the isolated guest 440 receives a request 455 to execute executable code 484. Isolated guest 440 determines that the executable code 484 is unavailable in the first isolated guest 440. In an example, isolated guest 440 may look for an executable code 484 in directories included in a $PATH variable. In an example, the $PATH variable may include a program to query a microservice registry 460 if a binary is unavailable in any directory listed in the $PATH variable. In an example, the isolated guest 440 may query the microservice registry 460 for a microservice that executes executable code 484. The isolated guest 440 may determine, based on the microservice registry 460, that the first microservice 414 executes the executable code 484. In an example, the isolated guest 440 may forward the request 455 to the first microservice 414, and receive a result 490 of the request 455 from the first microservice 414.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be executed by one or more processors, which when executing the series of computer instructions, performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A system of executing an executable code, the system comprising:
 a memory storing a microservice registry, the microservice registry including references to a plurality of microservices;
 one or more processors;
 a first isolated guest executing on the one or more processors;
 wherein the first isolated guest:
 receives a first request to execute a first executable code;
 determines that the first executable code is unavailable in the first isolated guest, wherein an error is produced;
 receives, after the error is overridden, a second request to search the microservice registry for a first microservice of the plurality of microservices to execute the first executable code;
 determines, based on the microservice registry, that the first microservice executes the first executable code;
 forwards the first request to the first microservice; and
 receives a result of the first request from the first microservice.

2. The system of claim 1, wherein the microservice registry and the first microservice are located over a network from the first isolated guest.

3. The system of claim 2, wherein the first isolated guest transfers data associated with the first request to the first microservice for the first microservice to process.

4. The system of claim 3, wherein the data associated with the first request is at least one of compressed and encrypted before being transferred.

5. The system of claim 2, wherein the microservice registry includes references to a second microservice that executes the first executable code; and
 the first isolated guest forwards the first request to the first microservice based on at least one of a version of the first executable code available on the first microservice, a version of the first executable code available on the second microservice, a current response time of the first microservice, a current response time of the second microservice, a location of the first microservice, a location of the second microservice, and a user selection of the first microservice.

6. The system of claim 1, wherein the executable code is at least one of a binary executable file, a script, and a program.

7. The system of claim 1, wherein there is a third request to execute a second executable code, which is determined to be unavailable in the first isolated guest.

8. The system of claim 7, wherein the first isolated guest determines that at least one of the first microservice and a second isolated guest executes the second executable code, the first isolated guest forwards the third request to at least one of the first microservice and the second isolated guest, and receives a result of the third request.

9. The system of claim 8, wherein the second isolated guest is hosted on one of a first hardware node, which hosts the first isolated guest, and a second hardware node, which is across a network from the first isolated guest.

10. The system of claim 7, wherein the first isolated guest determines that a first hardware node, which hosts the first isolated guest, executes the second executable code, the first isolated guest forwards the third request to the first hardware node, and receives a result of the third request from the first hardware node.

11. The system of claim 1, wherein the first isolated guest is configured to produce the error upon determining that the first executable code is unavailable in the first isolated guest.

12. The system of claim 1, wherein the first isolated guest outputs the result of the first request by displaying the result to a requester.

13. The system of claim 1, wherein the first isolated guest uses the result of the first request in making a third request, and the third request is executed by the first isolated guest.

14. A method of executing an executable code, the method comprising:
 receiving, by a first isolated guest, a first request to execute a first executable code;
 determining that the first executable code is unavailable on the first isolated guest, wherein an error is produced;
 receiving, after the error is overridden, a second request to search the microservice registry for a first microservice of the plurality of microservices to execute the first executable code;
 determining, based on a microservice registry, that the first microservice executes the first executable code;
 forwarding the first request to the first microservice; and
 receiving a result of the first request from the first microservice.

15. The method of claim 14, wherein the microservice registry and the first microservice are located over a network from the first isolated guest.

16. The method of claim 15, wherein the first isolated guest transfers data associated with the first request to the first microservice for the first microservice to process.

17. The method of claim 14, wherein there is a third request to execute a second executable code, the second executable code, which is determined to be unavailable in the first isolated guest; and
 the first isolated guest determines that at least one of the first microservice, a first hardware node, and a second isolated guest executes the second executable file.

18. The method of claim 14, wherein the first isolated guest is configured to produce the error upon determining that the first executable code is unavailable in the first isolated guest.

19. A computer-readable non-transitory storage medium storing executable instructions, which when executed by a computer system, cause the computer system to:
- receive, by a first isolated guest, a first request to execute a first executable code;
- determine that the first executable code is not available on the first isolated guest, wherein an error is produced;
- receive, after the error is overridden, a second request to search the microservice registry for a first microservice of the plurality of microservices to execute the first executable code;
- determine, based on a microservice registry, that the first microservice executes the first executable code;
- forward the first request to the first microservice; and
- receive a result of the first request from the first microservice.

* * * * *